(12) United States Patent
Kim

(10) Patent No.: US 8,098,219 B2
(45) Date of Patent: Jan. 17, 2012

(54) LIQUID CRYSTAL DISPLAY PANEL, LIQUID CRYSTAL DISPLAY DEVICE HAVING THE SAME, AND DRIVING METHOD THEREOF

(75) Inventor: Cheol Se Kim, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 967 days.

(21) Appl. No.: 11/639,315

(22) Filed: Dec. 15, 2006

(65) Prior Publication Data

US 2007/0262938 A1 Nov. 15, 2007

(30) Foreign Application Priority Data

May 10, 2006 (KR) .................. 10-2006-0041733

(51) Int. Cl.
*G09G 3/36* (2006.01)
(52) U.S. Cl. ............... 345/87; 345/88; 345/89; 345/90; 345/91; 345/92; 345/93; 345/94; 345/95
(58) Field of Classification Search ............. 345/87–103
See application file for complete search history.

(56) References Cited

U.S. PATENT DOCUMENTS

| | | | | |
|---|---|---|---|---|
| 4,830,467 A | * | 5/1989 | Inoue et al. | 345/94 |
| 7,221,337 B1 | * | 5/2007 | Choi et al. | 345/76 |
| 2004/0041765 A1 | * | 3/2004 | Koyama et al. | 345/87 |
| 2006/0164352 A1 | * | 7/2006 | Yoo et al. | 345/87 |

* cited by examiner

*Primary Examiner* — Amr Awad
*Assistant Examiner* — Andre Matthews
(74) *Attorney, Agent, or Firm* — McKenna Long & Aldridge LLP

(57) ABSTRACT

Provided is a liquid crystal display panel, a liquid crystal display device having the same, and a driving method thereof capable of improving image quality. The liquid crystal display device includes a liquid crystal display panel; a gate driver; and a data driver. The liquid crystal display panel includes pixel regions arranged in a matrix, each being defined by a gate line and first and second data lines crossing the gate line. The gate driver supplies a scan signal to the gate line. The data driver alternately supplies a data voltage and a common voltage to the first and second data lines.

14 Claims, 6 Drawing Sheets

LIQUID CRYSTAL DISPLAY PANEL, LIQUID CRYSTAL DISPLAY DEVICE HAVING THE SAME, AND DRIVING METHOD THEREOF

This application claims the benefit of Korean Patent Application No. 10-2006-0041733, filed on May 10, 2006, which is hereby incorporated by reference for all purposes as if fully set forth herein.

BACKGROUND OF THE INVENTION

1. Field of the Invention

The present invention relates to a liquid crystal display device, and more particularly, to a liquid crystal display panel, a liquid crystal display device having the same, and a driving method thereof.

2. Discussion of the Related Art

A liquid crystal display (LCD) device displays an image by controlling light transmittance of liquid crystal cells according to an image signal. The LCD device may be driven using an inversion scheme in which data applied to a liquid crystal cell is periodically inverted to reduce image flickering and the generation of an after-image. The inversion schemes includes a line inversion scheme in which the polarity of data for a vertical line is periodically inverted, a column inversion scheme in which the polarity of data for a horizontal line is inverted, and a dot inversion scheme in which the polarity of data is inverted for adjacent liquid crystal cells.

FIG. 1 is a schematic circuit diagram showing a liquid crystal display panel of a related art LCD device. The related art liquid crystal display panel is constructed by injecting liquid crystals between upper and lower glass substrates. As shown in FIG. 1, a plurality of gate lines Gn−1, Gn and Gn+1 are arranged in a first direction on the lower glass substrate and a plurality of data lines Dm−1, Dm and Dm+1 are arranged in a second direction. Pixel regions P are defined by crossings of the gate lines Gn−1, Gn and Gn+1, and the data lines Dm−1, Dm and Dm+1. A thin film transistor T and a pixel electrode are formed in each pixel region P. Red (R), green (G) and blue (B) color filters and a common electrode are formed on the upper glass substrate. In the illustrated LCD device of the related art, a liquid crystal cell Clc is formed between a pixel electrode on the lower glass substrate and the common electrode of the upper glass substrate. The liquid crystal cell Clc is driven by a data voltage supplied to the pixel electrode and a common voltage supplied to the common electrode.

A storage capacitor Cst (not shown) is formed at the overlap between the pixel electrode and a gate line. The storage capacitor Cst maintains a data voltage supplied to the pixel electrode for a first horizontal period H.

A scan signal is sequentially supplied to the plurality of gate lines Gn−1, Gn and Gn+1, to turn on the thin film transistors connected to the gate lines Gn−1, Gn and Gn+1. While the thin film transistors are turned on, a data voltage supplied to the plurality of data lines Dm−1, Dm and Dm+1 is applied to the pixel electrodes via the thin film transistors T. Accordingly, the data voltage supplied to the pixel electrodes of the lower glass substrate and the common voltage supplied to the common electrode of the upper glass substrate are applied to the liquid crystal cells Clc to display an image.

Referring to FIG. 2, when a gate high voltage Vgh is switched to a gate low voltage Vgl, a kickback voltage ΔVp as shown in Equation 1 below is generated by parasitic capacitance Cgd of the thin film transistor T. The kickback voltage ΔVp is charged into the liquid crystal cell Clc. This kickback voltage ΔVp causes a continuous voltage drop in the inversion type, regardless of whether the polarity of the data voltage is positive or negative. The kickback voltage ΔVp may be calculated using Equation 1.

$$\Delta Vp = \frac{Cgd}{Cgd + Cst + Clc}(Vgh - Vgl) \quad \text{(Equation 1)}$$

In Equation 1, ΔVp denotes a kickback voltage, Cgd denotes capacitance between a gate electrode and a drain electrode of the thin film transistor T, and Cst denotes storage capacitor. As may be appreciated from Equation 1, ΔVp varies directly with the parasitic capacitance Cgd of the thin film transistor.

For a given gray scale value, the charged amount for positive polarity data voltage dropped by the kickback voltage ΔVp becomes different from that of the negative polarity data voltage dropped by the kickback voltage ΔVp referenced to a common voltage Vcom, resulting in flickering as polarity is reversed. Depending on the inversion scheme used, the flickering may occur between dots, lines, or frames.

Further, although the LCD device is driven by the inversion scheme, an afterimage is still generated.

Additionally, in the related LCD device, to obtain high brightness, a data voltage is raised with respect to the common voltage Vcom to increase the electric potential difference therebetween. Since the data voltage is raised to obtain the high brightness, power consumption is disadvantageously increased.

In practice, different data voltages are supplied to respective liquid crystal cells Clc. Differing kickback voltages are generated by the different data voltages because the parasitic capacitance Cgd is a function of the data voltage. For this reason, kick back voltage cannot be effectively compensated for by adjusting the common voltage Vcom.

SUMMARY OF THE INVENTION

Accordingly, the present invention is directed to a liquid crystal display panel, a liquid crystal display device having the same, and a driving method thereof that substantially obviates one or more problems due to limitations and disadvantages of the related art.

An advantage of the present invention is to provide a liquid crystal display panel, a liquid crystal display device having the same, and a driving method thereof capable of improving image quality by preventing or reducing generation of an afterimage and image flickering.

Another advantage of the present invention is to provide a liquid crystal display panel, a liquid crystal display device having the same, and a driving method thereof capable of improving image quality by efficiently controlling different kickback voltages.

Another advantage of, the present invention is to provide a liquid crystal display panel, a liquid crystal display device having the same, and a driving method thereof capable of reducing power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel including a plurality of pixel regions arranged in a matrix, each pixel region includes a gate line; first and second data lines crossing the gate line; a first thin film transistor connected to the gate line and the first data line that applies a voltage applied to the first data line to a liquid crystal cell between the first and second data lines; a second thin film transistor connected to the gate line and the second data line that applies a voltage applied to the second data line to the liquid crystal cell, wherein the liquid crystal display panel includes a switching unit to alternately apply a data voltage and a common voltage to each of the first and second data lines.

In another aspect of the present invention, a liquid crystal display device includes: a liquid crystal display panel including pixel regions arranged in a matrix, each being defined by a gate line and first and second data lines crossing the gate line; a gate driver supplying a scan signal to the gate line; and a data driver alternately supplying a data voltage and a common voltage to the first and second data lines.

In yet another aspect of the present invention, a method of driving a liquid crystal display device includes a liquid crystal display panel including pixel regions arranged in a matrix, each including a gate line and first and second data lines crossing the gate line; and a gate driver and a data driver for driving the liquid crystal display panel, the method including: supplying a first data voltage to the first data line and supplying a common voltage to the second data line for a first period; and supplying a second data voltage to the second data line and supplying the common voltage to the first data line for a second period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
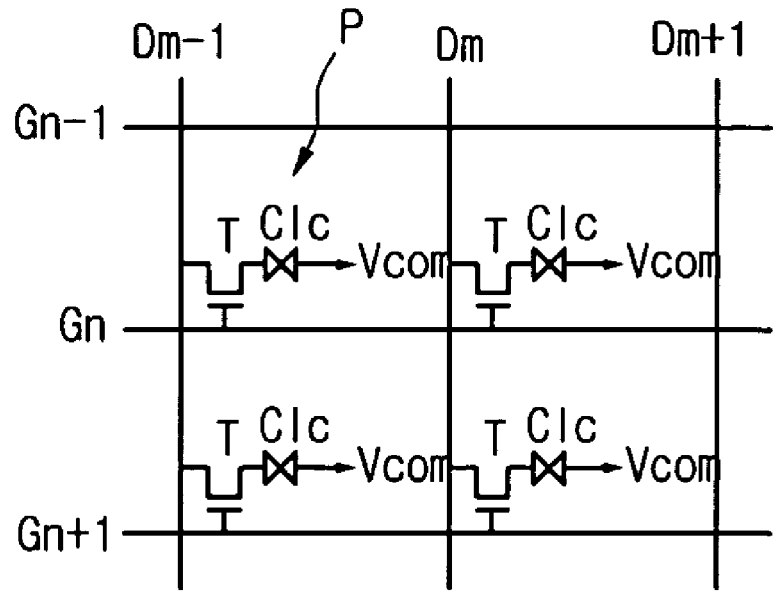
FIG. 1 is a schematic circuit diagram showing a liquid crystal display panel of a related art liquid crystal display device.
Figure 2:
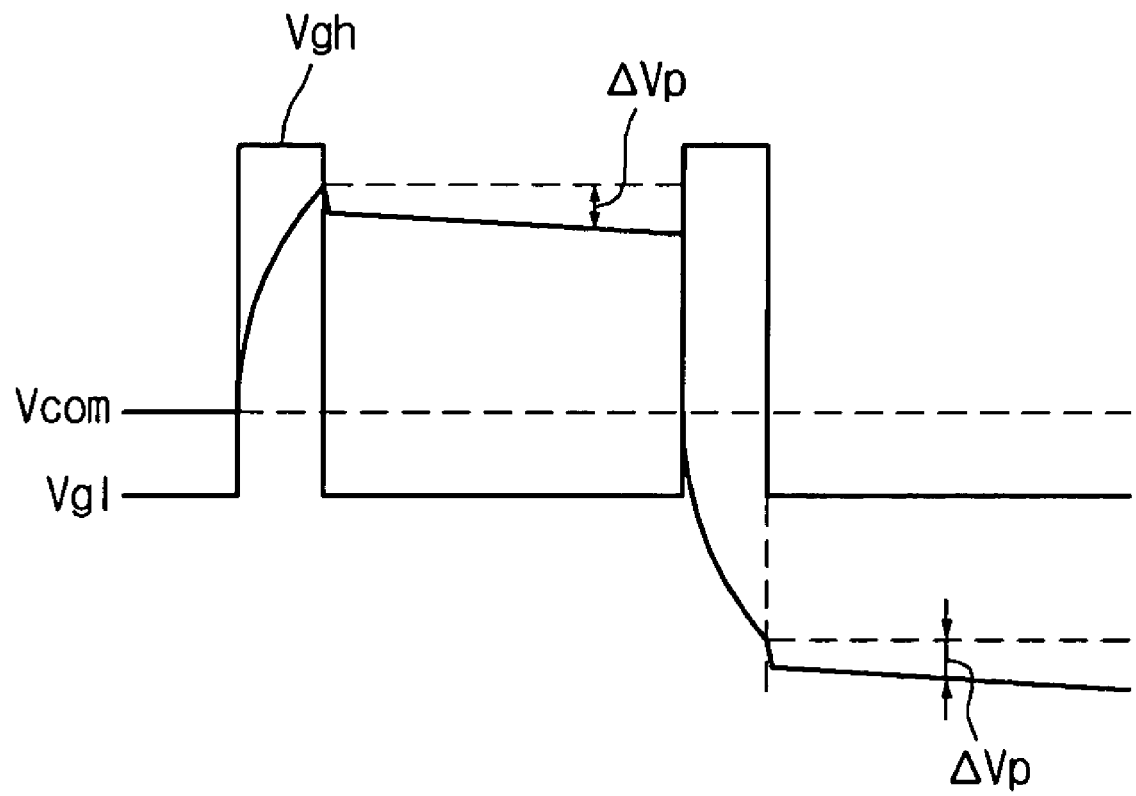
FIG. 2 is a waveform diagram showing a kickback voltage generated in the liquid crystal display panel of FIG. 1.
Figure 3:
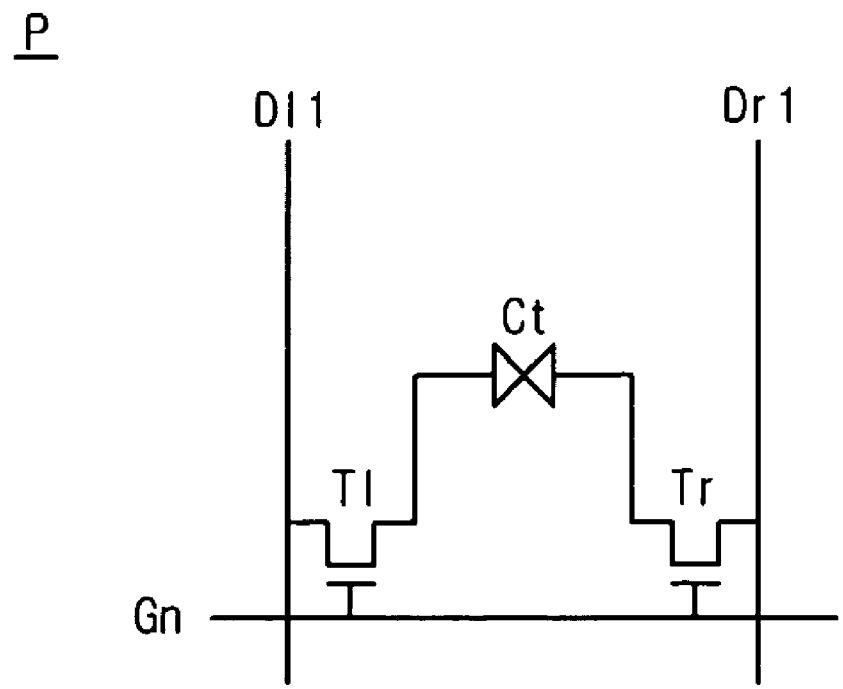
FIG. 3 is a schematic circuit diagram showing one pixel region according to an embodiment of the present invention.

FIG. 3 is a schematic circuit diagram showing one pixel region according to the present invention.

Referring to FIG. 3, a pixel region P according to an embodiment of the present invention may be defined by one gate line Gn and first and second data lines Dl1 and Dr1. The pixel region P includes first and second thin film transistors T1 and Tr, and one liquid crystal cell Ct.

Gate electrodes of the first and second thin film transistors T1 and Tr are connected in common to the gate line Gn, and drain electrodes thereof are connected in common to the liquid crystal cell Ct, while source electrodes of the first and second thin film transistors T1 and Tr are connected to the first and second data lines Dl1 and Dr1, respectively.

The liquid crystal cell Ct includes a liquid crystal capacitance (Clc) formed by liquid crystals and a storage capacitor formed by a gate line located at a former position or a predetermined common voltage line. First and second pixel electrodes are connected between the first and second thin film transistors T1 and Tr and the liquid crystal cell Ct.

Figure 4:
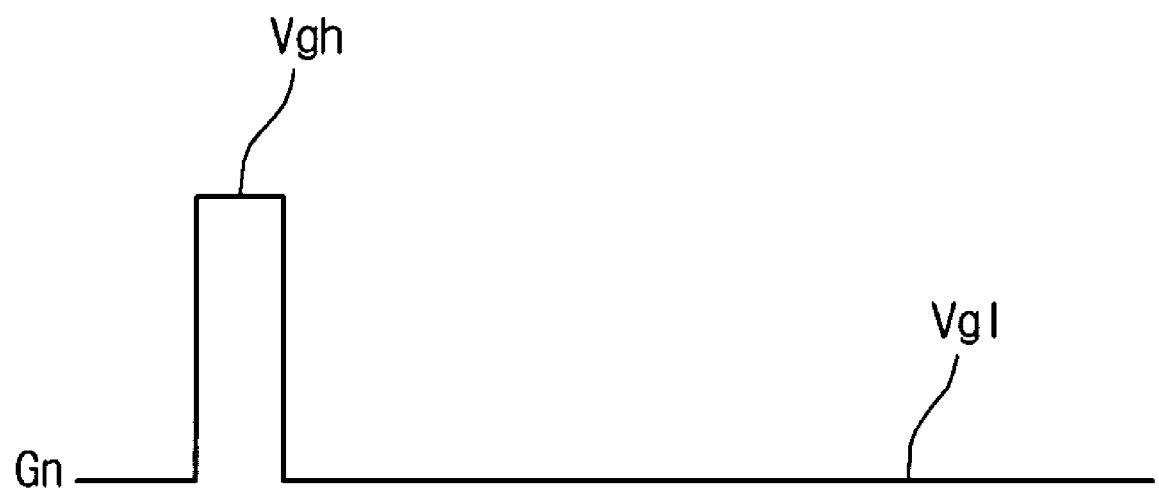
FIG. 4 is a waveform diagram showing a scan signal supplied to a gate line of the one pixel region of FIG. 3.

Referring to FIG. 4, a scan signal, that is, a gate high voltage Vgh is supplied to the gate line Gn for a first horizontal period H, and a gate low voltage is supplied thereto after the first horizontal period H until the next frame. Accordingly, when the scan signal, that is, the gate high voltage Vgh, is supplied to the gate line Gn, the first and second transistors T1 and Tr connected to the gate line Gn are simultaneously turned ON.

Either of a data voltage or a common voltage may be supplied to the first and second data lines Dl and Dr. For example, the data voltage may be supplied to the first data line Dl, while the common voltage is supplied to the second data line Dr. Alternatively, the common voltage may be supplied to the first data line Dl, while the data voltage is supplied to the second data line Dr.

The data voltage and the common voltage may be alternately supplied to the first and second data lines Dl and Dr in units of one frame. That is, a data voltage may be applied to the first data line Dl while a common voltage is applied to the second data line Dr during a first frame, and a common voltage may be applied to the first data line Dl while a data voltage is applied to the second data line Dr during a second frame. Alternatively, the data voltage and the common voltage may be alternately supplied to the first and second data lines Dl and Dr in units of two, three, four . . . , or s frames where s is an integer. For example, the data voltage may be supplied to the first data line Dl, and the common voltage may be supplied to the second data line Dr for the first s frames, and the data voltage may be supplied to the second data line Dr and the common voltage may be supplied to the first data line Dl for the second s frames.

The data voltage and the common voltage may be alternately supplied to the first and second data lines Dl and Dr in units of time to scan one gate line within one frame. Alternatively, the data voltage and the common voltage may be alternately supplied to the first and second data lines Dl and Dr in units of time to scan two, three, four, . . . , and t gate lines, where t is an integer. For example, the data voltage may be supplied to the first data line Dl and the common voltage is supplied to the second data line Dr while scanning the first t gate lines during a frame, and the data voltage may be supplied to the second data line Dr and the common voltage may be supplied to the first data line Dl while scanning the second t gate lines during a frame.

Figure 5:
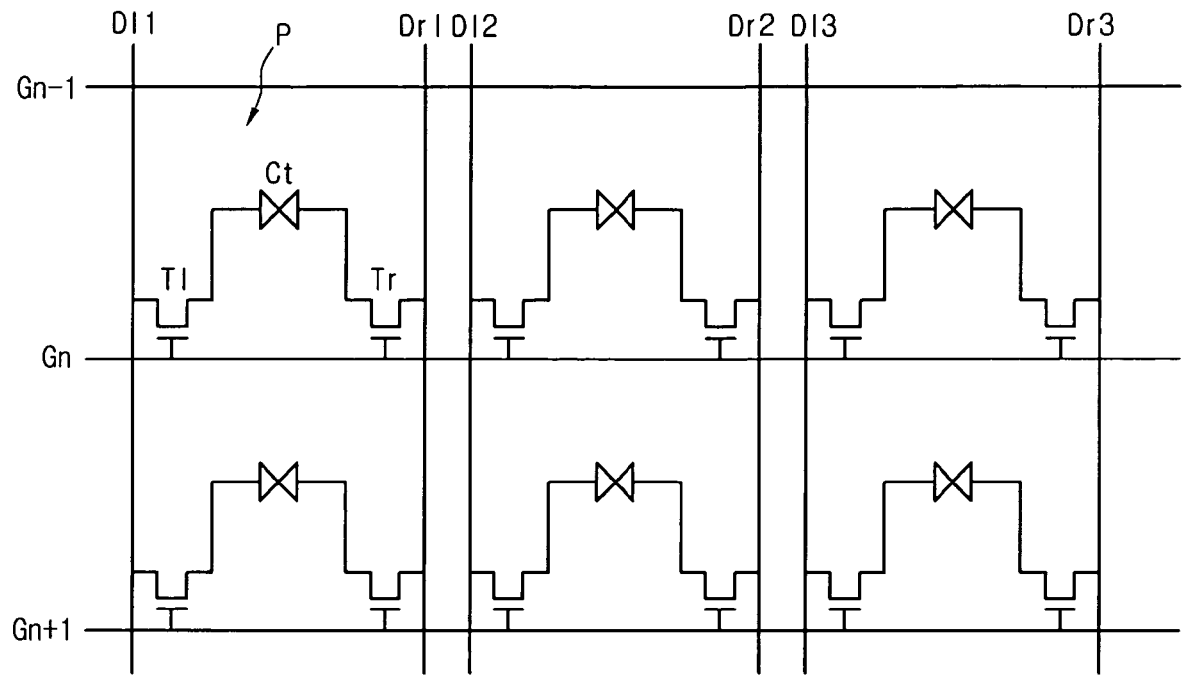
FIG. 5 is a schematic circuit diagram showing pixel regions of FIG. 3 arranged in a matrix.

As shown in FIG. 5, pixel regions P are arranged in a matrix to constitute a liquid crystal display (LCD) panel. Each pixel region may have the same structure as that of the single pixel region P illustrated in FIG. 3.

Figure 6:
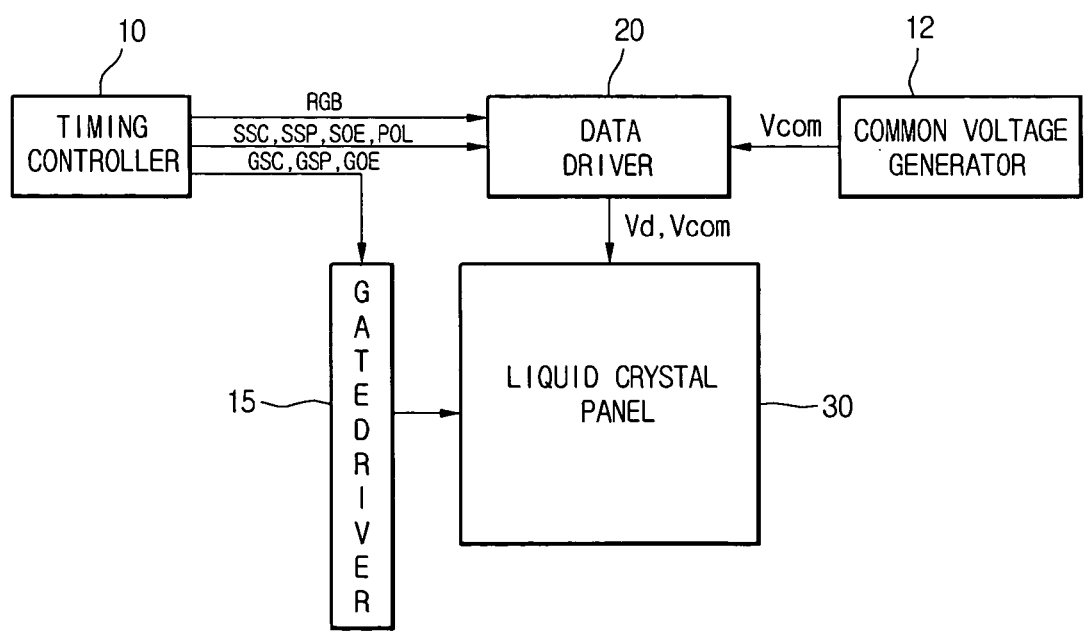
FIG. 6 is a block diagram of a liquid crystal display device including the liquid crystal display panel of FIG. 5.

FIG. 6 is a block diagram showing an LCD device including the liquid crystal display panel of FIG. 5. Referring to FIG. 6, the LCD device according an embodiment of to the present invention includes a timing controller 10, a gate driver 15, a data driver 20, and a liquid crystal display panel 30.

The timing controller 10 generates first and second control signals for controlling the gate driver 15 and the data driver 20 using a clock signal CLK and vertical/horizontal synchronizing signals V and H supplied from a source external to the LCD device. That is, the timing controller 10 generates the first control signal for controlling the gate driver 15 and the second control signal for controlling the data driver using the vertical/horizontal synchronizing signals V and H and the clock signal CLK. The first control signal includes gate shift clock (GSC), gate start pulse (GSP), and the gate output enable (GOE) signals, and the second control signal includes scan shift clock (SSC), scan start pulse (SSP), scan output enable (SOE), and the polarity control (POL) signals. The timing controller 10 supplies the first control signal to the gate driver 15, while supplying the second control signal and a digital data signal RGB to the data driver 20.

The gate driver 15 sequentially generates scan signals of the first horizontal period H, that is, gate high voltages Vgh, and supplies the gate high voltages Vgh to the respective gate lines Gn−1, Gn and Gn+1 in response to the first control signal.

Figure 7:
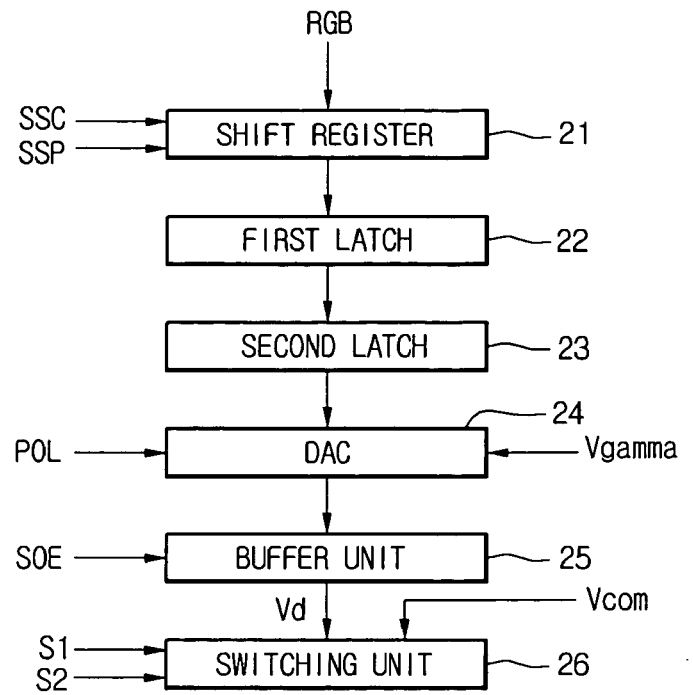
FIG. 7 is a block diagram of a data driver of FIG. 6.

Referring to FIG. 7, the data driver 20 includes a shift register 21, a first latch 22, a second latch 23, a digital-analog converter (DAC) 24, a buffer unit 25 and a switching unit 26. The shift register 21, the first latch 22, the second latch 23, the DAC 24, and the buffer unit 25 will be briefly described.

The shift register 21 sequentially outputs a predetermined signal using the SSC signal and the SSP signal. A digital data signal (red (R), green (G), or blue (B)) for one line is sequentially latched in the first latch 22 in response to a sampling signal. After being latched in the first latch 22, the digital data signal RGB for a single line is latched in the second latch 23.

The DAC 24 outputs a data voltage Vd corresponding to the digital data signal RGB latched to the second latch 23, using a predetermined gamma value Vgamma generated from a gamma value generator. The digital data signal for the single line may undergo inversion to a data voltage of positive or negative polarity in response to the POL signal supplied from the timing controller 10. Accordingly, the data voltage of the positive or negative polarity is output to the buffer unit 25 from the DAC 24.

The buffer unit 25 outputs a data voltage Vd in response to the SOE signal.

The switching unit 26 will now be described in detail. The switching unit 26 receives a data voltage Vd from the buffer unit 25, and receives a common voltage Vcom from a common voltage generator 12. The data voltage Vd and the common voltage Vcom may be alternately output in response to predetermined control signals S1 and S2.

The data voltage Vd and the common voltage Vcom output from the switching unit 26 are periodically alternately supplied to first data lines Dl1, Dl2 and Dl3 and second data lines Dr1, Dr2 and Dr3 of the pixel regions P. For example, the data voltage Vd is supplied to the first data line Dl1 and the common voltage Vcom is supplied to the second data line Dr1 during a first period. During a second period, the data voltage Vd is supplied to the second data line Dr1 and the common voltage Vcom is supplied to the first data line Dl1 by switching of the switching unit 26. In this manner, the data voltage Vd and the common voltage Vcom may be alternately supplied to the first and second data lines Dl1 and Dr1 for each period. The period may refer to a time period for scanning a unit of t gate lines within one frame, or to the time period of a unit of s frames.

Figure 8:
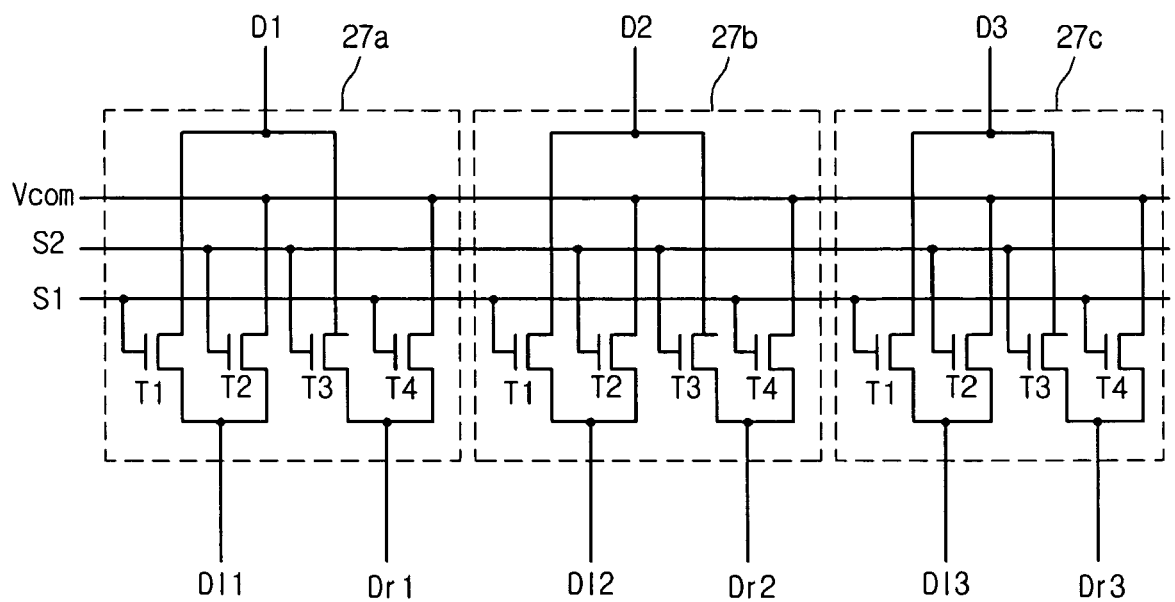
FIG. 8 is a schematic circuit diagram of a switching unit of FIG. 7.

Referring to FIG. 8, the switching unit 26 may include a plurality of switches 27a, 27b and 27c, with each switch corresponding to a respective pixel region P of the liquid crystal display panel 30. Each of the switches 27a, 27b and 27c may include first through fourth transistors T1 through T4. The first through fourth transistors first T1 through T4 may be NMOS type transistors or PMOS type transistors.

FIG. 8 is a view showing an example connection structure of the first through fourth transistors provided for the convenience of explanation, and various connection structures may be used without departing from the spirit of the invention.

For example, drain electrodes of the first and second transistors T1 and T2 may be connected to first data lines Dl1, Dl2 and Dl3, while drain electrodes of the third and fourth transistors T3 and T4 are connected to the second data lines Dr1, Dr2 and Dr3.

Gate electrodes of the first and fourth transistors T1 and T4 may be connected to a first control line through which a first control signal S1 is supplied, while gate electrodes of the second and third transistors T2 and T3 may be connected to a second control line through which a second control signal S2 is supplied.

Source electrodes of the first and third transistors T1 and T3 are connected to output lines D1, D2 and D3 of the buffer unit 25, while source electrodes of the second and fourth transistors T2 and T4 may be connected to common lines through which a common voltage Vcom is supplied.

Each of the switches 27a, 27b and 27c may be controlled so that the data voltage Vd and the common voltage Vcom can be periodically alternately supplied to the first data lines Dl1, Dl2 and Dl3 and the second data lines Dr1, Dr2 and Dr3.

For example, when the first control signal S1 has a high level and the second control signal S2 has a low level during a first period, the first and fourth transistors T1 and T4 are turned ON, and the second and third transistors T2 and T3 are turned OFF. Accordingly, the data voltage Vd is supplied to the data lines Dl1, Dl2 and Dl3 via the first transistors T1, and the common voltage Vcom is supplied to the second data lines Dr1, Dr2 and Dr3 via the fourth transistors T4. In the case where the first control signal S1 has a low level and the second control signal S2 has a high level during a second period, the second and third transistors T2 and T3 are turned ON, and the first and fourth transistors T1 and T4 are turned OFF. Accordingly, the common voltage Vcom is supplied to the first data lines Dl1, Dl2 and Dl3 via the second transistors T2, and the data voltage Vd is supplied to the second data lines Dr1, Dr2 and Dr3 via the third transistors T3.

As described above, data voltages Vd and the common voltage Vcom may each be alternately supplied to the first data lines Dl1, Dl2 and Dl3 and the second data lines Dr1, Dr2 and Dr3 for each period. The period may refer to a time period for scanning a unit of t gate lines within one frame, or to the time period of a unit of s frames.

To provide a the better understanding of the present invention, an example case where a data voltage Vd and a common voltage Vcom are supplied to the first data lines Dl1, Dl2 and Dl3 and the second data lines Dr1, Dr2 and Dr3 in units of a gate line (FIG. 9) within one frame or in units of a frame (FIG. 10) will be described.

Figure 9:
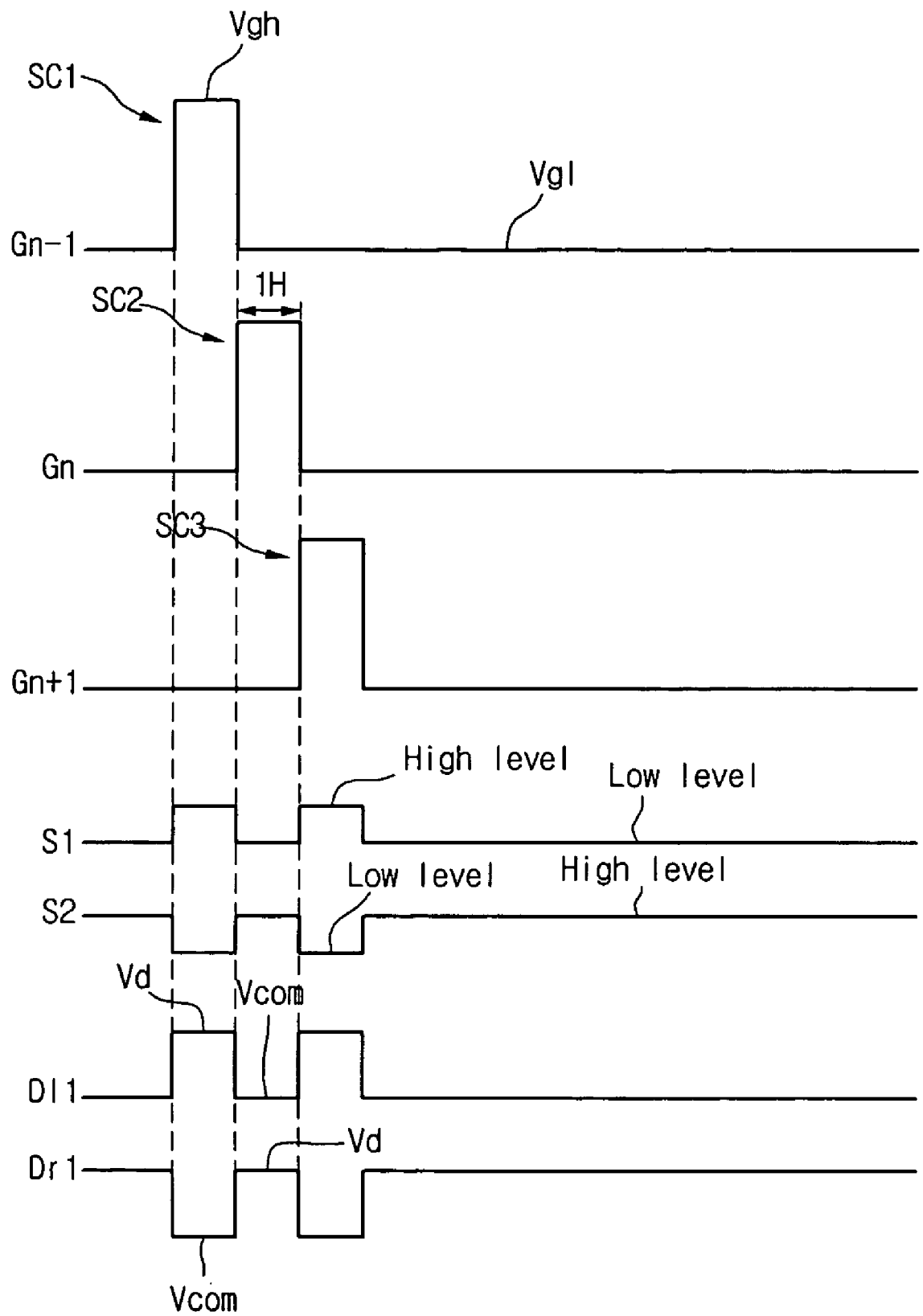
FIG. 9 is a waveform diagram showing a data voltage and a common voltage supplied to alternate lines.

Referring to FIG. 9, scan signals SC1, SC2 and SC3, namely, gate high voltages Vgh, are sequentially supplied to respective gate lines Gn−1, Gn and Gn+1 of the liquid crystal display panel 30 during a first horizontal period. A gate low voltage Vgl is supplied to each of the gate lines Gn−1, Gn and Gn+1 after the first horizontal period until the next frame.

While the first scan signal SC1 is being supplied to the n−1$^{th}$ gate line Gn−1, the first control signal S1 has a high level, and the second control signal S2 has a low level. Accordingly, the first and fourth transistors T1 and T4 of each of the switches 27a, 27b and 27c of the switching unit 26 are turned ON, so that the data voltage Vd is supplied to the first data lines Dl1, Dl2 and Dl3 of the pixel regions P on the n−1$^{th}$ gate line Gn−1, and the common voltage Vcom is supplied to the second data lines Dr1, Dr2 and Dr3 of the pixel regions P on the n−1$^{th}$ gate line Gn−1.

While the second scan signal SC2 is being supplied to the n$^{th}$ gate line Gn, the first control signal S1 has a low level, and the second control signal S2 has a high level. Accordingly, the second and third transistors T2 and T3 of each of the switches 27a, 27b and 27c of the switching unit 26 are turned ON, so that the data voltage Vd is supplied to the second data lines Dr1, Dr2 and Dr3 of the pixel regions P on the n$^{th}$ gate line Gn, and the common voltage Vcom is supplied to the first data lines Dl1, Dl2 and Dl3 of the pixel regions P on the n$^{th}$ gate line Gn.

While the third scan signal SC3 is being supplied to the n+1$^{th}$ gate line Gn+1, the first control signal S1 has a high level and the second control signal S2 has a low level. Accordingly, the first and fourth transistors T1 and T4 of each of the switches 27a, 27b and 27c of the switching unit 26 are turned ON, so that the data voltage Vd is supplied to the first data lines Dl1, Dl2 and Dl3 of the pixel regions P on the n+1$^{th}$ gate line Gn+1, and the common voltage Vcom is supplied to the second data lines Dr1, Dr2 and Dr3 of the pixel regions P on the n+1$^{th}$ gate line Gn+1.

Therefore, the data voltage Vd and the common voltage Vcom are periodically and alternately supplied to the first data lines Dl1, Dl2 and Dl3 and the second data lines Dr1, Dr2 and Dr3 in units of each gate line Gn−1, Gn and Gn+1 within one frame. Accordingly, a residual DC voltage is not developed on each of the gate lines Gn−1, Gn and Gn+1, thereby preventing the generation of afterimages.

Figure 10:
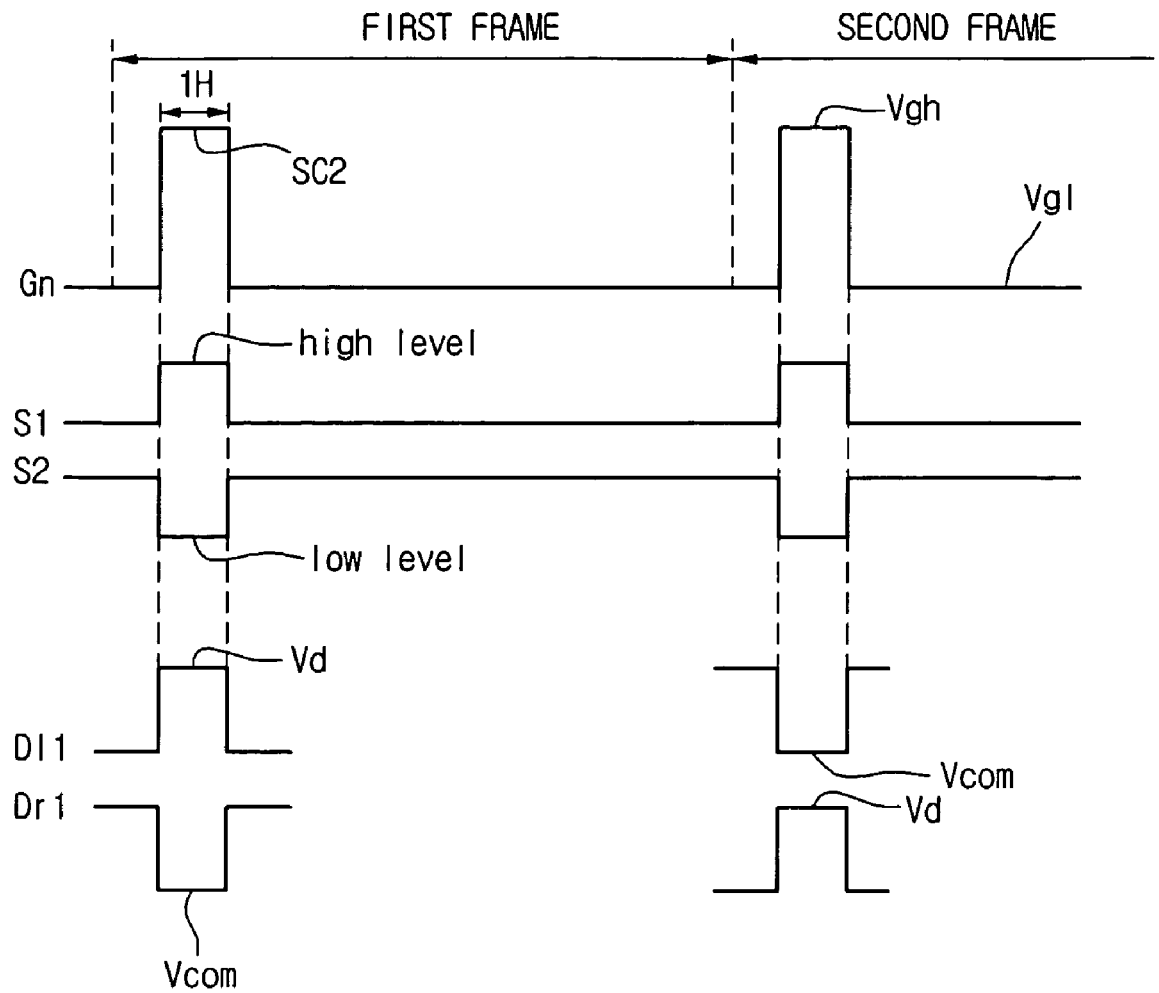
FIG. 10 is a waveform diagram showing a data voltage and a common voltage supplied in alternate frames.

Referring to FIG. 10, a second scan signal SC2 is supplied to the n$^{th}$ gate line Gn within a first frame, and a second scan signal SC2 is supplied to the n$^{th}$ gate line Gn within a second frame. For the convenience in description, the description will be made limited to the n$^{th}$ gate line Gn of each frame.

While the second scan signal SC2 is being supplied to the n$^{th}$ gate line Gn in the first frame, a first control signal S1 has a high level and a second control signal S2 has a low level. Accordingly, the first and fourth transistors T1 and Tr of each of the switches 27a, 27b and 27c of the switching unit 26 are turned ON, so that a data voltage Vd is supplied to the first data lines Dl1, Dl2 and Dl3, and a common voltage Vcom is supplied to the second data lines Dr1, Dr2 and Dr3.

While the second scan signal SC2 is being supplied to the n$^{th}$ gate line Gn in the second frame, a first control signal S1 has a low level and a second control signal S2 has a high level. Accordingly, the second and third transistors T2 and T3 of each of the switches 27a, 27b and 27c are turned ON, so that the data voltage Vd is supplied to the second data lines Dr1, Dr2 and Dr3, and the common voltage Vcom is supplied to the first data lines Dl1, Dl2 and Dl3.

As a result, the data voltage Vd and the common voltage Vcom are periodically alternately supplied to the first data lines Dl1, Dl2 and Dl3 and the second data lines Dr1, Dr2 and Dr3 in units of each frame. Accordingly, a residual DC does not exist on each of the gate lines and the creation of an afterimage may be prevented.

The data voltage Vd and the common voltage Vcom may be periodically alternately supplied to the first data lines Dl1, Dl2 and Dl3 and the second data lines Dr1, Dr2 and Dr3 in units of not only each frame but the voltage applied to the first and second data lines may also be alternated for each gate line within each frame.

The data voltage Vd and the common voltage Vcom may be periodically supplied to the first data lines Dl1, Dl2 and Dl3 and the second data lines Dr1, Dr2 and Dr3 in units of only each frame. On the other hand, within each frame, the data voltage Vd and the common voltage Vcom may be supplied to the first data lines Dl1, Dl2 and Dl3 and the second data lines Dr1, Dr2 and Dr3 in a predetermined manner for the corresponding frame regardless of each gate line. For example, in the case where the data voltage Vd is supplied to the first data lines Dl1, Dl2 and Dl3 and the common voltage Vcom is supplied to the second data lines Dr1, Dr2 and Dr3 in a corresponding frame, the data voltage Vd may be supplied to the first data line Dl1 and the common voltage Vcom may be supplied to the second data line Dr1 for every data line of the corresponding frame.

Although the switching unit 26 is provided at the data driver 20 in the description above, the switching unit 26 may be formed directly on the liquid crystal display panel 30 using a semiconductor process. When the switching unit 26 is formed on the liquid crystal display panel, the first through fourth transistors T1 through T4 of each of the switches 27a, 27b and 27c of the switching unit 26 may be formed of polysilicon, microcrystalline silicon, amorphous silicon, or the like.

Figure 11:
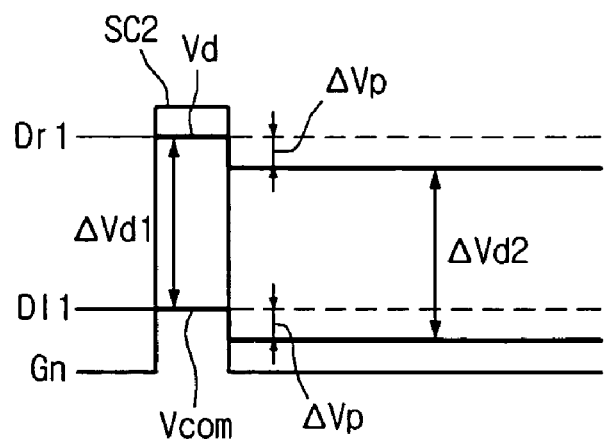
FIG. 11 is a waveform diagram showing a kickback voltage generated from the liquid crystal display panel of FIG. 5.

The present invention maybe used to reduce or preventing afterimages but also contributes to reducing or eliminating image flickering, as may be understood from FIG. 11.

Referring to FIG. 11, the second scan signal SC2, namely, a gate high voltage Vgh, is supplied to the n$^{th}$ gate line Gn, to turn ON the first and second thin film transistors T1 and Tr of the pixel regions P on the n$^{th}$ gate line Gn. In this case, a data voltage Vd is supplied to the first data lines Dl1, Dl2 and Dl3, and a common voltage Vcom is supplied to the second data lines Dr1, Dr2 and Dr3 by switching of the switches 27a, 27b and 27c of the switching unit 26. Thus, a first potential difference ΔVd1 between the data voltage Vd and the common voltage Vcom is supplied to the liquid crystal cells Clc.

A gate high voltage Vgh is supplied to the nth gate line Gn for the first horizontal period H, and a gate low voltage Vgl is supplied thereto after the first horizontal period H. When the gate high voltage Vgh changes to the gate low voltage Vgl, a kickback voltage ΔVp is generated by parasitic capacitance Cgd of the first and second transistors T1 and Tr. When the parasitic capacitance Cgd of the first thin film transistor T1 and that of the second thin film transistor Tr are equal to each other, the kickback voltages thereof become identical. When the gate high voltage Vgh changes to the gate low voltage Vgl, the data voltage Vd is dropped by the kickback voltage ΔVp and the common voltage Vcom is also dropped by the kickback voltage ΔVp. Accordingly, in the liquid crystal cell Clc a second potential difference ΔVd2 between the data voltage Vd dropped by the kickback voltage ΔVp and the common voltage Vcom dropped by the kickback voltage ΔVp is sustained. Since both the data voltage Vd and the common voltage Vcom are dropped by the same kickback voltage ΔVp, the first potential difference ΔVd1 and the second potential difference ΔVd2 are equal to each other. Therefore, the first and second thin film transistors T1 and Tr each apply the same kickback voltage in each pixel region P, so that the potential difference supplied to the liquid crystal cell Clc becomes identical after and before the gate high voltage Vgh is inverted to the gate low voltage Vgl. Accordingly, the desired gray scale associated with a data voltage applied to the liquid crystal cell Clc can be correctly expressed, and the image flickering can be reduced or eliminated to thereby improving display quality.

Additionally, in the illustrated embodiment of the present invention, the first thin film transistors T1 connected to the first data line Dl1 and the second thin film transistors Tr connected to the second data line Dr are provided in each pixel region P, so that the data voltage Vd and the common voltage Vcom are alternately supplied to the first and second data lines Dl1 and Dr1. Accordingly, a residual DC existing on each gate line may be removed to thereby preventing afterimages from occurring.

As described above, according to the present invention, the first and second thin film transistors causing the same kickback voltage are provided in each pixel region, so that desired gray scale can be expressed, flickering is prevented, and thus display quality can be improved.

According to embodiments of the present invention, the first and second data lines are connected to the respective first and second thin film transistors in each pixel region. Thus, the data voltage and the common voltage are alternately supplied to the first and second data lines, thereby removing a residual DC on each gate line and preventing afterimages. Accordingly, the display quality can be improved.

As opposed to the related art in which a kickback voltage is controlled by varying the common voltage Vcom, the data voltage Vd and the common voltage Vcom are periodically alternately supplied to the first data lines Dl1, Dl2 and Dl3 and the second data lines Dr1, Dr2 and Dr3 of the pixel regions P. Thus, the gray scale can be correctly expressed regardless of the kickback voltage. Accordingly, in a liquid crystal display according to the present invention the detrimental effects of the kickback voltage on display quality may be reduced or eliminated.

By varying the data voltage and the common voltage varied relative to each other, the voltage swing of the data voltage may be decreased to about of half of the voltage swing of the related art using a fixed common voltage. Accordingly, power consumption may be advantageously decreased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel comprising a plurality of pixel regions arranged in a matrix, each pixel region including:
 a gate line; first and second data lines crossing the gate line;
 a first thin film transistor connected to the gate line and the first data line that applies a voltage on the first data line to a liquid crystal cell between the first and second data lines; and
 a second thin film transistor connected to the gate line and the second data line that applies a voltage on the second data line to the liquid crystal cell,
 wherein the liquid crystal display panel includes a switching unit that alternately applies a data voltage and a common voltage to each of the first and second data lines,
 wherein the switching unit alternately applies the data voltage and the common voltage in response to first and second control signals to the first and second data lines,
 wherein drain electrodes of the first and second thin film transistors are connected in common to the liquid crystal cell,
 wherein the data voltage and the common voltage are alternately supplied to the first and second data lines of each pixel region for a predetermined period,
 wherein the switching unit includes a plurality of switches respectively corresponding to each pixel region, each of the switches includes first through fourth transistors being one of NMOS type transistor and PMOS type transistor,
 wherein the first and fourth transistors are connected to a first control signal line to which the first control signal is supplied, wherein the first transistor supplies the data voltage to the first data line and the fourth transistor supplies the common voltage to the second data line simultaneously, and the second and third transistors are connected to a second control signal line to which the second control signal is supplied, wherein the second transistor supplies the common voltage to the first data line and the third transistor supplies the data voltage to the second data line simultaneously.

2. The liquid crystal display panel according to claim 1, wherein the first and second thin film transistors have the same parasitic capacitance.

3. The liquid crystal display panel according to claim 1, wherein the predetermined period is a unit of s frames periods, where s is an integer greater than or equal to 1.

4. The liquid crystal display panel according to claim 1, wherein the predetermined period is a period to scan t gate lines within a frame period where t is an integer greater than or equal to 1.

5. The liquid crystal display panel according to claim 1, wherein the data voltage and the common voltage are alternately supplied to the first and second data lines of each pixel in units of s frame periods and in units of time to scan t gate lines within a frame period where s and t are each integers greater than or equal to 1.

6. A liquid crystal display device comprising:
 a liquid crystal display panel including pixel regions arranged in a matrix, each pixel region defined by a gate line and first and second data lines crossing the gate line;
 a gate driver supplying a scan signal to the gate line; and
 a data driver that alternately supplies a data voltage and a common voltage to the first and second data lines,
 wherein the pixel regions each include a first thin film transistor connected to the gate line and the first data line, a second thin film transistor connected to the gate line and the second data line and a liquid crystal cell formed between the first and second thin film transistors,
 wherein the data driver alternately supplies the data voltage and the common voltage supplied to the first and second data lines for each predetermined period,
 wherein the data driver includes a switching unit that alternately supplies the data voltage and the common voltage to the first and second data lines,
 wherein the switching unit alternately applies the data voltage and the common voltage in response to first and second control signals to the first and second data lines, wherein the switching unit includes a plurality of switches respectively corresponding to each pixel region, each of the switches includes first through fourth transistors being one of NMOS type transistor and PMOS type transistor, wherein the first and fourth transistors are connected to a first control signal line to which the first control signal is supplied, wherein the first transistor supplies the data voltage to the first data line and the fourth transistor supplies the common voltage to the second data line simultaneously, and the second and third transistors are connected to a second control signal line to which the second control signal is supplied, wherein the second transistor supplies the common voltage to the first data line and the third transistor supplies the data voltage to the second data line simultaneously.

7. The liquid crystal display device according to claim 6, wherein the first and second thin film transistors have the same parasitic capacitance.

8. The liquid crystal display device according to claim 6, wherein the predetermined period is a unit of s frames periods, where s is an integer greater than or equal to 1.

9. The liquid crystal display device according to claim 6, wherein the predetermined period is a period to scan t gate lines within one frame period where t is an integer greater than or equal to 1.

10. The liquid crystal display device according to claim 6, wherein the data voltage and the common voltage are alternately supplied to the first and second data lines in units of s frames periods and in units of time to scan t gate lines within each frame period where s and t are each integers greater than or equal to 1.

11. The liquid crystal display device according to claim 6, wherein the switching unit is formed on the liquid crystal display panel.

12. A method of driving a liquid crystal display device including a liquid crystal display panel including pixel regions arranged in a matrix, each pixel region including a gate line and first and second data lines crossing the gate line; and a gate driver and a data driver for driving the liquid crystal display panel, the method comprising:

generating first and second control signals for controlling a time period to alternately apply a data voltage and a common voltage to the first and second data lines;

supplying a first data voltage to the first data line and supplying the common voltage to the second data line for the first time period; and supplying a second data voltage to the second data line and supplying the common voltage to the first data line for the second time period, wherein the liquid crystal display panel includes a switching unit that alternately applies the data voltage and the common voltage to each of the first and second data lines, wherein the switching unit alternately applies the data voltage and the common voltage in response to the first and second control signals to the first and second data lines, wherein the switching unit includes a plurality of switches respectively corresponding to each pixel region, each of the switches includes first through fourth transistors being one of NMOS type transistor and PMOS type transistor, wherein the first and fourth transistors are connected to a first control signal line to which the first control signal is supplied, wherein the first transistor supplies the data voltage to the first data line and the fourth transistor supplies the common voltage to the second data line simultaneously, and the second and third transistors are connected to a second control signal line to which the second control signal is supplied, wherein the second transistor supplies the common voltage to the first data line and the third transistor supplies the data voltage to the second data line simultaneously.

13. The method according to claim 12, wherein the time period is a unit of s frames periods, where s is an integer greater than or equal to 1.

14. The method according to claim 12, wherein the time period is a time period for scanning t gate lines within one frame period where t is an integer greater than or equal to 1.

* * * * *